Jan. 3, 1928.

C. C. BRETON 1,654,958

LOCKING FOLDABLE JOINT

Filed July 19, 1923

2 Sheets-Sheet 1

Inventor
Charles C. Breton
by Popp & Powers
Attys

Jan. 3, 1928.
C. C. BRETON
1,654,958
LOCKING FOLDABLE JOINT
Filed July 19, 1923    2 Sheets-Sheet 2
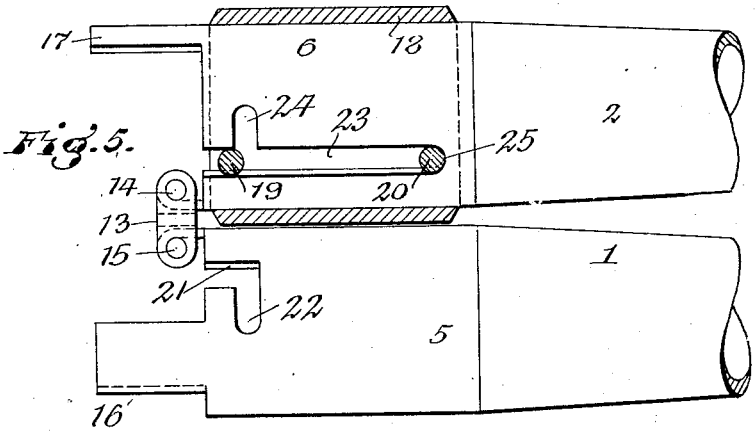
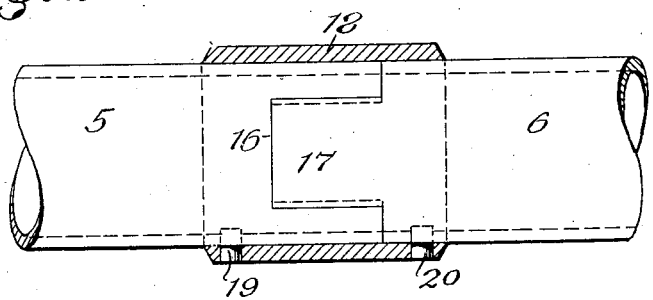
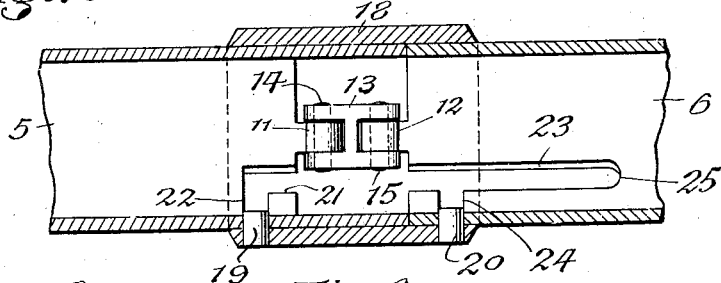
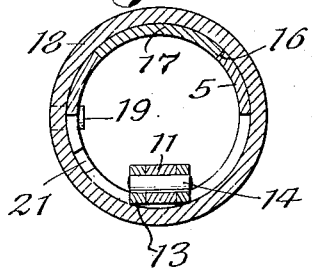
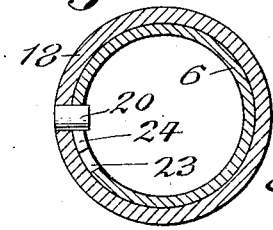

Patented Jan. 3, 1928.

1,654,958

UNITED STATES PATENT OFFICE.

CHARLES C. BRETON, OF DEPEW, NEW YORK.

LOCKING FOLDABLE JOINT.

Application filed July 19, 1923. Serial No. 652,607.

This invention relates to a locking joint for foldably connecting two members so that the same can be stowed away and transported more compactly, but readily unfolded and held reliably in their relative operative position when required for use.

Such a locking joint is particularly suitable for use in shovels, fishing poles, umbrellas and the like, the rod, bar or shaft of which may by this means be divided into sections which are connected by means of this locking joint and thereby permit these sections to be folded relatively to each other so that the device as a whole takes up less room and these sections can also be locked securely in their unfolded position so that the device can be used in a normal manner.

It is the object of this invention to provide a locking joint of this character which will securely unite the parts and render the same strong and durable when in their operative position, which can be easily and readily operated for locking or unlocking the joint when it is desired to either use the device in its unfolded condition or to store the same in its folded condition, and which is so designed that it presents a substantially smooth exterior and permits of conveniently and efficiently manipulating the device without liability of injuring the hands of the operator or user.

Figure 1:
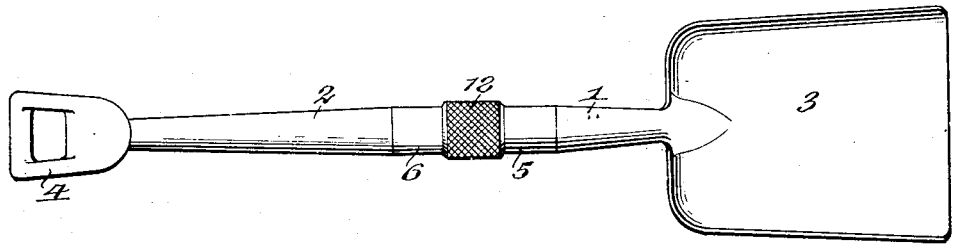
Figure 2:
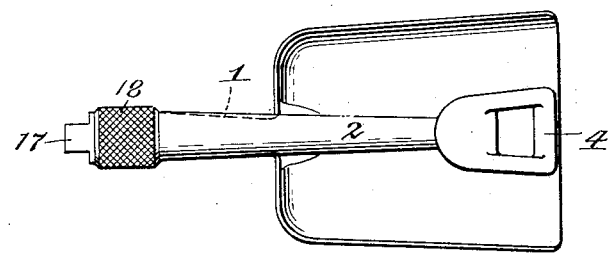
Figure 3:
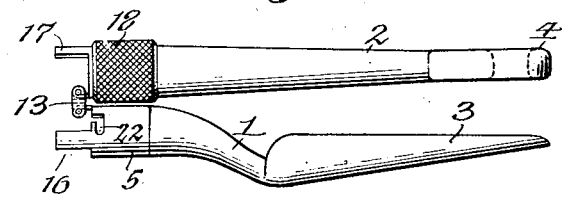
Figure 4:
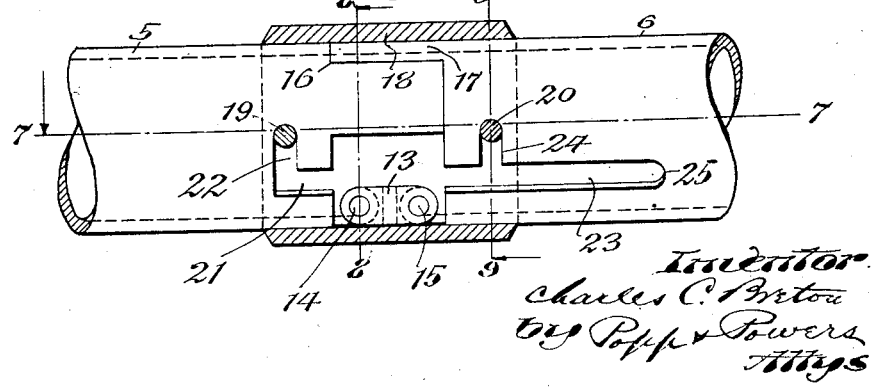

In the accompanying drawings:

Figure 1 is a top plan view of a shovel showing its bar or shaft equipped with my invention, so as to render it possible to fold the members or sections of this bar in order to reduce the length of the shovel as a whole and permit of storing the same more conveniently. Fig. 2 is a top plan view of the shovel showing the shaft or the bar of same folded for bringing the handle over the scoop in which position the length of the shovel as a whole has been reduced and thus permits of more convenient storage and transportation. Fig. 3 is a side view of the same. Fig. 4 is a fragmentary longitudinal section, on an enlarged scale of the joint between the two relatively movable members which are to be coupled, showing the same in an unfolded and locked position, corresponding to that shown in Fig. 1. Fig. 5 is a similar view, but showing the parts corresponding to the position shown in Fig. 3. Fig. 6 is a top plan view, on an enlarged scale corresponding to Fig. 4, but showing the locking sleeve in section. Fig. 7 is a longitudinal section taken on line 7—7, Fig. 4. Figs. 8 and 9 are cross sections taken on the correspondingly numbered lines in Fig. 4.

Similar characters of reference indicate like parts throughout the several views.

Although this invention is applicable for a variety of uses in which it is desired to fold or double up two members or sections relatively to each other for the sake of reducing the length thereof and rendering the same more suitable for storage or transportation when compactness is desired, as for instance, in the case of shovels, fishing poles, and umbrellas, the drawings illustrate this invention in connection with a shovel which is more particularly designed for use in case of emergency by the driver of an automobile when it becomes necessary to extricate the car after getting mired in a muddy road, or stuck in a snow bank. As shown in the drawings, this shovel consists generally of a longitudinal bar, shaft or rod which is divided so as to form a lower or front section 1 and an upper or rear section 2, a scoop 3 arranged at the lower end of the front section, and a handle 4 at the upper end of the rear section, which parts may be made of any suitable shape and of any approved material. The opposing ends of the front and rear sections of the shaft or bar of this shovel are connected by means of the locking joint embodying my invention so as to permit these two sections to be doubled or folded together, this device being preferably so organized that the handle is arranged over the front side of the scoop in the folded position of the parts.

My improved locking joint may be variously constructed so far as its details are concerned, and the particular organization shown in the drawings is, therefore, to be merely regarded as one of numerous forms appropriate for carrying my invention into effect. As there shown, this locking joint is constructed as follows:

The numerals 5 and 6 represent tubular end pieces or ferrules arranged respectively at the opposite ends of the front and rear sections of the shovel bar sections or members 1 and 2. These end pieces are preferably constructed of metal which is of tubular form but may if desired be constructed of other appropriate shapes or materials. On the opposing edge portions of these tubular end members and on one side of the axis of the shovel bar, the same are provided with opposing pivot eyes 11 and 12, which are spaced apart from each other, and each of which has its opening arranged transversely relatively to the axis of the shovel bar. These two pivot eyes are connected to each other so as to form a pivotal connection between the two end pieces and permit of moving the same into a folded and unfolded position relatively to each other. In its preferred form this pivotal connection comprises a folding link 13 which is arranged lengthwise and has its opposite ends pivotally connected by means of pintles 14 and 15 which extend transversely through opposite ends of this link and the pivot eyes 11, 12 of the end pieces. This link may be variously formed, but preferably in the shape of the letter H, as shown in Fig. 7.

As shown in the drawings, the pintles are constructed in the form of rivets, but if desired screws, bolts or similar fastenings may be employed instead. The relative arrangement of the pivot eyes 11, 12 and the coupling link 13 is such that when the end pieces of the bar sections or members of the shovel are arranged end to end, these eyes and the link will be arranged inside of the bore of both of these end pieces, and the link will be arranged lengthwise of or parallel with the axis of the same, as shown in Fig. 4, this being the position of the parts when the sections or members of the shovel bar are shifted into their unfolded position preparatory to being used. In the folded position of the bar sections or members, the coupling link is arranged crosswise of the axes of the two bar sections or members and its intermediate part is outside of the periphery thereof, which construction permits these bar members or sections to be arranged parallel or substantially parallel with each other when in a folded position, as shown in Figs. 3 and 5, thereby enabling the shovel to be doubled or folded to the maximum extent so that it occupies the minimum amount of space which is particularly desirable in case of automobiles in which a very limited amount of space is available for storage purposes.

The pivotal connection between the bar members or sections operates within certain limits as means for preventing these members from turning relatively to each other about the axes of these members or sections. In order, however, to increase the strength of the joint between these sections when the same are unfolded to be used and aid the pivotal connection between the same for preventing relative rotation of these bar members or sections, means are provided on the edge portions of the end pieces thereon, which are arranged diametrically opposite to this pivotal connection and which operate to interlock these end pieces. In the preferred construction shown in the drawings, this is accomplished by providing one of the end pieces, for instance the end piece 5, with a notch or recess 16 arranged opposite to the companion pivot eye 11, and providing the opposite edge portion of the other end piece with a tongue 17 which is opposite its companion pivot eye 12 and adapted to engage with the recess 16 in the unfolded position of the parts, as shown in Figs. 4, 6 and 8. By this means a reliable interlocking between the end pieces is secured which positively holds the same against rotary motion relatively to each other when the bar members are unfolded and thereby relieves the pivotal connection between the link and the pivot eyes of undue strain.

Any suitable mechanism may be provided for holding the two end pieces and the parts associated therewith in an unfolded position relatively to each other, but those shown in the drawings are preferred inasmuch as they have been found satisfactory in actual use. As there shown, these locking means are constructed as follows:

18 represents a locking sleeve having a close fit on the peripheries of the end pieces 5 and 6 and adapted to slide lengthwise thereon for the purpose of either moving this sleeve across the joint between these end pieces and holding the same in axial alignment with each other when the bar sections are unfolded and also movable lengthwise to one side of this joint for the purpose of permitting these end pieces and associated parts to be folded into a position in which they are arranged side by side or parallel with each other. This locking sleeve is preferably constructed of metal and has its periphery knurled or otherwise roughened, so that the same may be more readily turned by the grasp of the hand. Means are provided for limiting the longitudinal movement of this locking sleeve into and out of its operative position, and also to permit of interlocking the same with both end pieces when this sleeve extends across the joint between the end pieces by imparting a rotary movement to this sleeve. In the preferred construction, this is accomplished by providing the end pieces 5 and 6 with angular or bayonet slots which are adapted to be engaged by locking pins 19 and 20 arranged on the end portions of the bore of the locking sleeve. The bayonet slot in the end piece 5 comprises a longitudinal portion 21 and a transverse portion 22 extending circumferentially from the inner end of the longitudinal portion 21. The bayonet slot in the end piece 6 comprises a longitudinal slot 23, which is longer than the slot 21, and a transverse portion 24 extending circumferentially from the longitudinal portion 23 at a point between the extremities thereof. The longitudinal portions 21 and 23 of both of these bayonet slots open into the edge portions of the end pieces and are in line with each other in the unfolded position of the joint, as shown in Fig. 4.

In the folded position of the bar members, as shown in Fig. 5 the locking sleeve 18 has been moved so that the same is arranged wholly on the end piece 6 in which case both of the locking pins 19 and 20 are arranged within the longitudinal portion 23 of the bayonet slot of this member and the backward movement of this sleeve is limited by engagement of the pin 20 with the inner end 25 of this slot portion, while the other pin 19 is arranged in the slot portion 23 between the transverse slot portion 24 and the edge of the tubular end piece 6. While the parts are in this position, the two bar members may be freely folded and unfolded without interference from the locking sleeve 18. After the bar members have been shifted into their unfolded position in which their end pieces butt against each other and are in axial alignment, the locking sleeve may be moved forwardly across the joint between the end pieces during which movement the pin 19 first enters the longitudinal slot portion 21 until it strikes the inner end of the same and is in line with the transverse slot portion 22 and the other locking pin 20 moves from the inner end 25 of the slot portion 23 to a position opposite the mouth of the transverse slot portion 24. While in this position the sleeve will hold the end pieces and connecting parts in alignment or in an unfolded position, so that the tool of which they form a part can be used in a normal manner. In order, however, to retain this locking sleeve in this position, the same upon reaching this outermost position is also turned or rotated circumferentially about the end pieces and thereby causes its locking pins 19 and 20 to enter the transverse slot portions 22 and 24 until they strike the inner extremities of the same, as shown in Fig. 4. When the parts are in this position, the sleeve is positively held against longitudinal movement on the end pieces, thereby securely holding the parts locked in their operative position. In order to unlock this joint and permit of folding its members to secure compactness the locking sleeve 18 must be first rotated in a reverse direction and then slid backwardly from the position indicated in Fig. 4 to the position shown in Fig. 5.

When the parts are in their unfolded position and interlocked with each other by properly manipulating the sleeve 18, a practically smooth external surface is presented on the joint between the relatively foldable members, thereby permitting this sectional bar to be used as freely and with as little liability of injuring the hands as though the same were made of one continuous or integral piece. This is a very desirable feature in the case of a shovel or other tools or devices in the use of which the hand is moved back and forth over the joint. Obviously any decided obstruction or projection on the joint would be liable to injure the hand of the operator or interfere with the free use of the device which objection in the present case is wholly eliminated.

Aside from being very simple in construction and neat in appearance, this locking joint is very strong and durable and can be very easily and conveniently manipulated for either unlocking the joint or locking the same preparatory to using the device of which it forms a part.

I claim as my invention:

A locking joint for foldably connecting two members, comprising two tubular ferrules mounted on said members, respectively, pivot eyes extending longitudinally outwardly from corresponding edge portions of said ferrules on one side of the axis of the same, a link connected at its opposite ends by transverse pintles with said eyes, one of said ferrules being provided diametrically opposite its hinge eye with a single tongue and the other ferrule being provided diametrically opposite its hinge eye with a recess formed between two lugs on the respective end of said ferrule, said ferrules being also provided at a point in their circumference between said hinge eyes and tongue and recess with corresponding slots each of which has a longitudinal part extending to the end of the ferrule and a transverse part extending laterally from the respective longitudinal part, the transverse part of the slot in one of the ferrules being arranged at the inner end of its companion longitudinal slot and the transverse part of the slot in the other ferrule being arranged at the outer end of its companion longitudinal part and a locking sleeve slidable lengthwise on said ferrules across the opposing ends thereof and also capable of rotating circumferentially relatively thereto and provided at its opposite ends with inwardly projecting pins adapted to move in the longitudinal parts of said slots upon moving said sleeve lengthwise and to engage the transverse parts of the same upon rotating the sleeve.

CHARLES C. BRETON.